United States Patent [19]

Throckmorton

[11] 3,910,869

[45] Oct. 7, 1975

[54] CHEMICAL PROCESS

[75] Inventor: Morford C. Throckmorton, Akron, Ohio

[73] Assignee: The Goodyear Tire & Rubber Company, Akron, Ohio

[22] Filed: Dec. 3, 1974

[21] Appl. No.: 529,160

Related U.S. Application Data

[63] Continuation of Ser. No. 438,301, Jan. 31, 1974, abandoned, which is a continuation-in-part of Ser. No. 12,902, Feb. 19, 1970, abandoned, which is a continuation of Ser. No. 617,788, Feb. 23, 1967, abandoned.

[52] U.S. Cl. ............... 260/94.3; 260/82.1; 252/429
[51] Int. Cl.² ....................... C08D 1/14; C08D 3/08
[58] Field of Search ........ 260/94.3, 82.1; 450/633.5

[56] References Cited
FOREIGN PATENTS OR APPLICATIONS
1,135,175    8/1962   Germany ........................... 260/94.3
908,335      10/1962  United Kingdom ................ 260/94.3

*Primary Examiner*—William F. Hamrock
*Attorney, Agent, or Firm*—F. W. Brunner; J. Y. Clowney

[57] ABSTRACT

There is disclosed a process for the polymerization of butadiene and butadiene in mixture with other diolefins to form polymers containing a high proportion of the butadiene units in the cis-1,4 configuration which comprises contacting said monomer under solution polymerization conditions at temperatures ranging from about −10°C to about 100°C with a catalyst comprising
1. an organoaluminum compound
2. an organonickel compound
3. hydrogen fluoride.

7 Claims, No Drawings

CHEMICAL PROCESS

This application is a continuation of Ser. No. 438,301 filed Jan. 31, 1974, which is a continuation-in-part of Ser. No. 12,902 filed Feb. 19, 1970, which is a continuation of Ser. No. 617,788 filed Feb. 23, 1967, all of which are now abandoned.

This invention is directed to a method of polymerization of butadiene and/or butadiene in mixture with other diolefins to form polymers with a high content of cis 1,4 addition. It is also directed to catalyst systems useful for this purpose. Such polymers have been found to possess properties which make them useful as synthetic rubbers.

It is an object of this invention to provide a method whereby butadiene can be polymerized to a high content of cis 1,4 polybutadiene. Another object is to provide a catalyst system by which these polymerizations may be accomplished. Another object is to form copolymers of isoprene and butadiene in which the polybutadiene segment has a high content of cis 1,4 structure. Other objects will become apparent as the description proceeds.

According to the invention, butadiene or butadiene in mixture with other diolefins is polymerized by contacting butadiene or butadiene in combination with other diolefins under solution polymerization conditions with a catalyst system comprising (1) at least one organometallic compound selected from the group consisting of trihydrocarbylalumium compounds, aluminum dihydrocarbylhydride compounds, lithium hydrocarbyl compounds and lithium aluminum tetrahydrocarbyl compounds, (2) at least one nickel salt of a carboxyl acid or a complex compound of nickel, and (3) hydrogen fluoride.

The aluminum hydrocarbyl compounds and the aluminum dihydrocarbyl hydride compounds which may be utilized as the first catalyst component of this invention may be defined by the formula:

in which $R_1$ is selected from the group consisting of alkyl (including cycloalkyl), aryl, alkaryl, arylalkyl, hydrogen and fluorine, $R_2$ and $R_3$ being selected from the group of alkyl (including cycloalkyl), aryl, alkaryl, and arylalkyl. Representative of the compounds responding to the formula set forth above are: diethyl aluminum fluoride, di-n-propyl aluminum fluoride, di-n-butyl aluminum fluoride, diisobutyl aluminum fluoride, di-hexyl aluminum fluoride, dioctyl aluminum fluoride, and diphenyl aluminum fluoride. Also included are diethyl aluminum hydride, di-n-propyl aluminum hydride, di-n-butyl aluminum hydride, di-isobutyl aluminum hydride, diphenyl aluminum hydride, di-p-tolyl aluminum hydride, dibenzyl aluminum hydride, phenyl ethyl aluminum hydride, phenyl-n-propyl aluminum hydride, p-tolyl ethyl aluminum hydride, p-tolyl n-propyl aluminum hydride, p-tolyl isopropyl aluminum hydride, benzyl ethyl aluminum hydride, benzyl n-propyl aluminum hydride, and benzyl isopropyl aluminum hydride and other organo aluminum hydrides. Also included are trimethyl aluminum, triethyl aluminum, tri-n-propyl aluminum, triisopropyl aluminum, tri-n-butyl aluminum, tri-isobutyl aluminum, tripentyl aluminum, trihexyl aluminum, tricyclohexyl aluminum, trioctyl aluminum, triphenyl aluminum, tri-p-tolyl aluminum, tribenzyl aluminum, ethyl diphenyl aluminum, ethyl di-p-tolyl aluminum, ethyl dibenzyl aluminum, diethyl phenyl aluminum, diethyl p-tolyl aluminum, diethyl benzyl aluminum and other tri-organo aluminum compounds.

The lithium hydrocarbyl compounds which may be employed as the first catalyst component of this invention may be defined by the formula:

wherein R is an alkyl, alkaryl, arylalkyl or aryl group. Representative among the compounds responding to this formula are ethyllithium, propyllithium, n-, sec- or t-butyllithium, hexyllithium, styryllithium, phenyllithium, benzyllithium and the like.

The lithium aluminum tetrahydrocarbyl compounds useful as the first catalyst component of this invention may be defined by the formula:

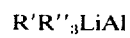

where R' and R'' may be alkyl, alkaryl, or arylalkyl groups. R' and R'' may or may not be the same. Representative of these compounds are n-butyl-triisobutyl lithium aluminum, tetrabutyllithium aluminum, tetraisobutyl-lithium aluminum, butyl triethyl lithium aluminum and styryl tri (normal propyl) lithium aluminum.

The component of the catalyst of this invention which contains nickel may be any nickel salt of a carboxylic acid or organic complex compound of nickel. It is preferred to employ a soluble compound of nickel. These soluble nickel compounds are normally compounds of nickel with a mono- or bi-dentate organic ligand containing up to 20 carbon atoms. "Ligand" is defined as an ion or molecule bound to and considered bonded to a metal atom or ion. Mono-dentate means having one position through which covalent or coordinate bonds with the metal may be formed; bi-dentate means having two positions through which covalent or coordinate bonds with the metal may be formed. By the term "soluble" is meant soluble in inert solvents. Thus, any salt of an organic acid containing from about 1 to 20 carbon atoms may be employed. Representative of organo nickel compounds are nickel benzoate, nickel acetate, nickel naphthenate, nickel octanoate, bis(α-furyl dioxime) nickel, nickel palmitate, nickel stearate, nickel acetylacetonate, nickel salicaldehyde, bis(-salicylaldehyde) ethylene diimine nickel and nickel tetracarbonyl.

Of course, the hydrogen fluoride component of the catalyst is simply gaseous or liquid hydrogen fluoride. It, of course, should be anhydrous and as pure as possible. The hydrogen fluoride can be dissolved in a solvent and thus can be handled and charged to the system as a liquid solution. The solvent may be an alkyl, alkaryl, arylalkyl or aryl hydrocarbon, for example, benzene is a convenient solvent.

The three catalyst components may be charged separately in either stepwise or simultaneous addition to the polymerization system. The three catalyst components must be added separately to the polymerization mixture of butadiene and/or butadiene with other diolefins. The polymerization mixture is the monomer or monomers to be polymerized mixed with an inert solvent, a term best described later in this specification. It has been found that if the three catalyst components are mixed together and allowed to stand without being placed in contact with the butadiene, the activity is quickly adversely affected.

This three-component catalyst system has polymerization activity over a wide range of catalyst concentration and catalyst ratios. The three catalyst components inter-react to form the active catalyst. As a result, the optimum concentration for any one catalyst component is very dependent upon the concentrations of each of the other two catalyst components. Furthermore while polymerization will occur over a wide range of catalyst concentrations and ratios, polymers having the most desirable properties are obtained over a narrower range. Polymerization can occur while the mol ratio of the organometallic compound (Me) to the nickel salt or nickel complex (Ni) ranges from about 0.3/1 to about 300/1; the mol ratio of hydrogen fluoride (HF) to the organo nickel compound (Ni) ranges from about 0.5/1 to about 500/1 and the mol ratio of hydrogen fluoride to the organo metallic compound ranges from about 0.4/1 to about 15/1. However, the preferred mol ratios of Me/Ni ranges from about 2/1 to about 80/1, the preferred mol ratio of HF/Ni ranges from about 3/1 to about 150/1 and the preferred mol ratio of HF/Me ranges from about 1/1 to about 10/1.

The concentration of the catalyst employed depends on factors such as purity, rate desired, temperature and other factors, therefore, specific concentrations cannot be set forth except to say that catalytic amounts are used. Some specific concentrations and ratios which produce elastomers having desirable properties will be illustrated in the Examples given herein to explain the teachings of this invention.

In general, the polymerizations of this invention are carried out in any inert solvent, and are, thus, solution polymerizations. By the term "inert solvent" is meant that the solvent or diluent does not enter into the structure of the resulting polymer nor does it adversely affect the properties of the resulting polymer nor does it have any adverse effect on the activity of the catalyst employed. Such solvents are usually aliphatic, aromatic, or cycloaliphatic hydrocarbons, examples of which are pentane, hexane, toluene, benzene, cyclohexane and the like. Preferred solvents are hexane and benzene. The solvent/monomer volume ratio may be varied over a wide range. Up to 20 or more to 1 volume ratio of solvent to monomer can be employed. It is usually preferred or more convenient to use a solvent/monomer volume ratio of about 3/1 to about 6/1. Suspension polymerization may be carried out by using a solvent, e.g., butane or pentane, in which the polymer formed is insoluble. It should be understood, however, that it is not intended to exclude bulk polymerizations from the scope of this application.

It is usually desirable to conduct the polymerizations of this invention employing air-free and moisture-free techniques.

The temperatures employed in the polymerizations of this invention are not critical and may vary from a very low temperature such as −10°C. or below up to high temperatures such as 100°C. or higher. However, it is usually more desirable to employ a more convenient temperature between about 30°C. and about 90°C.

The practice of this invention is further illustrated by reference to the following examples which are intended to be representative rather than restrictive of the scope of this invention. Unless otherwise noted, all parts and percentages are by weight. Dilute solution viscosities (DSV) have been determined in toluene at 30°C.

EXAMPLE 1

A butadiene-benzene solution was purified by passing through a silica gel column and by sparging with purified nitrogen. This solution which contained 10 grams of butadiene per 100 milliliters was placed in a polymerization vessel and protected with nitrogen. Triethyl aluminum (TEAL) in the amount of 0.06 millimole and nickel octanoate in the amount of 0.005 millimole were added. The vessel was closed and an amount of hydrogen fluoride gas was added which was equivalent to 0.09 millimole. This mixture was allowed to polymerize at a constant temperature of 50°C. while being agitated. At the end of 2 hours, the polymerization was stopped by the injection of 0.1 gram of 1,1′,1″-nitrilotri-2-propanol and 0.1 gram of 2,4-di-t-butylpara-cresol. The resulting polymer was dried at 45°C. in a vacuum oven at 28 inches of mercury. The yield of polymer was 7 grams, thus indicating 70 per cent conversion. This polymer was subjected to several analyses and the microstructure, as determined by infrared was 97.5 per cent cis-1,4; 1.3 per cent trans-1,4 and 1.2 per cent 1,2-polybutadiene. This polybutadiene had an inherent viscosity of 4.2 as determined in toluene at 30°C. The polybutadiene was also completely soluble in benzene.

EXAMPLE 2

A polymerization was conducted in a manner similar to that described in Example 1 except 0.08 millimomle of triethyl aluminum, 0.005 millimole of nickel octanoate and 0.27 millimole of HF gas were employed. In another similar experiment cobalt octanoate was substituted for the nickel octanoate. The polymerizations were conducted for 17 hours at 50°C. The results were as follows:

| Exp. No. | Catalyst | Conversion | DSV | % Cis-1,4 |
|---|---|---|---|---|
| 1 | Ni octanoate | 80.0% | 3.31 | 96.7 |
| 2 | Co octanoate | 6.0% | ND | ND |

DSV = dilute solution viscosity
ND = not determined

These results indicate that organo cobalt compounds are greatly inferior to, and are not suitable replacements for, the organo nickel compounds described in this process.

The increased amounts of HF charged in Experiment 1 of this Example as compared with Example 1 resulted in producing an elastomer having a lower DSV than obtained in Example 1, but otherwise the polymers were similar.

EXAMPLE 3

A polymerization was conducted in a manner similar to that described in Example 1 except that hydrogen fluoride was added as a benzene solution. This hydrogen fluoride-benzene solution was prepared by bubbling gaseous HF into dry deaerated benzene to give 0.7 grams of HF in 207 ml of benzene which was 0.17 molar HF in benzene. The catalyst consisted of 0.06 millimoles of triethyl aluminum, 0.005 millimoles of nickel octanoate and 0.09 millimoles HF per 10 grams of butadiene. At the end of 18.5 hours at 50°C. the conversion to polybutadiene was 68 per cent. The dilute solution viscosity was determined to be 5.47.

EXAMPLE 4

A butadiene-benzene solution was prepared as outlined in Example 1. The solution was catalyzed by adding 0.06 millimole of triethylaluminum, 0.005 millimole nickel octanoate and 0.225 millimole of HF in benzene, per 10 grams of butadiene. Butadiene-hexane solutions which contained 9 grams of butadiene per 100 ml of solution after purification were prepared in a similar manner. One of these solutions was polymerized with equivalent amounts of catalysts, while 0.40 millimole HF was added to another solution. The polymerizations were conducted at 50°C. for 18 to 20 hours, and the results were as follows:

| Exp No. | Catalyst charged millimole/100 ml. | | | Solvent | Yield % | DSV |
|---|---|---|---|---|---|---|
| | TEAL | NiOct | HF | | | |
| 1 | 0.06 | 0.005 | 0.225 | Benzene | 90. | 3.69 |
| 2 | 0.06 | 0.005 | 0.225 | Hexane | 84. | 4.52 |
| 3 | 0.06 | 0.005 | 0.40 | Hexane | 13. | ND |

The first two elastomers appeared to be similar except that the one prepared in hexane had a higher DSV. On the other hand, when the HF level was increased, the polymerization activity was greatly impaired.

EXAMPLE 5

Butadiene-benzene solutions were prepared as outlined in Example 1 and a series of polymerizations was conducted in which the only variable was the amount of HF added. The temperature was 50°C., the time 18 hours and the solvent was benzene. The amount of catalyst per 10 grams of butadiene and the results obtained are reported in the following table.

| TEAL | Ni Oct | HF | Yield % | DSV | % cis |
|---|---|---|---|---|---|
| 0.06 | 0.005 | 0.075 | 10 | ND | ND |
| 0.06 | 0.005 | .090 | 79 | 5.03 | 97.7 |
| 0.06 | 0.005 | .12 | 92 | 4.68 | ND |
| 0.06 | 0.005 | .15 | 92 | 4.49 | ND |
| 0.06 | 0.005 | .225 | 91 | 3.69 | ND |
| 0.06 | 0.005 | .30 | 87 | 3.60 | ND |

EXAMPLE 6

Several polymerizations were conducted at conditions similar to those presented in Example 5 except slightly higher triethylaluminum and nickel catalyst levels were used. One set of four runs (2A, 2B, 2C, and 2D) were charged identically but individual polymerizations were stopped after 1,2,4 and 18 hours respectively. The results were as follows:

| Exp No. | Millimole/100 ml | | | Polymerization Time, Hrs | Yield Wt % | DSV |
|---|---|---|---|---|---|---|
| | TEAL | Ni Oct | HF | | | |
| 1 | 0.10 | 0.005 | 0.25 | 18 | 90 | 4.55 |
| 2A | 0.10 | 0.005 | 0.375 | 1 | 40 | ND |
| 2B | 0.10 | 0.005 | 0.375 | 2 | 72 | 4.11 |
| 2C | 0.10 | 0.005 | 0.375 | 4 | 86 | 3.94 |
| 2D | 0.10 | 0.005 | 0.375 | 18 | 96 | 4.13 |
| 3 | 0.10 | 0.010 | 0.125 | 18 | 73 | 5.13 |
| 4 | 0.10 | 0.010 | 0.150 | 18 | 90 | 5.12 |
| 5 | 0.10 | 0.010 | 0.250 | 18 | 94 | 4.69 |
| 6 | 0.10 | 0.010 | 0.375 | 18 | 95 | 3.07 |

EXAMPLE 7

Diethyaluminum fluoride (DEAF) was used as an alternate for triethylaluminum in some experiments. Polymerizations were conducted at 50°C. for 18 hours according to the procedure outlined in Example 1. The following results were obtained:

| Exp No | Catalyst charged, Millimole/100 cc solution | | | Solvent | Yield Wt % | DSV | % cis |
|---|---|---|---|---|---|---|---|
| | DEAF | NiOct | HF | | | | |
| 1 | 0.08 | 0.01 | 0.09 gas | Benzene | 90 | 3.83 | ND |
| 2 | 0.08 | 0.01 | 0.12 gas | Benzene | 86 | 4.03 | ND |
| 3 | 0.08 | 0.01 | 0.09 in Bz | Benzene | 79 | 4.63 | 97.5 |
| 4 | 0.06 | 0.005 | 0.15 in Bz | Hexane | 27 | 4.12 | ND |

EXAMPLE 8

A solution containing 3,417 grams of butadiene and 24,190 grams of benzene was passed through silica gel columns. Then 25,250 grams of this solution were charged to a 10 gallon stirred reactor. A current of lamp-grade $N_2$ was bubbled through the solution for 2 minutes to remove any dissolved air. The solution contained 11.1 wt. per cent butadiene according to a VPC (vapor phase chromatograph) analysis.

The catalyst charge was 22.6 millimoles of triethylaluminim, 1.4 millimoles of nickel octanoate and 105. millimoles of HF which were added under pressure in benzene. The polymerization was conducted at 50°C. Polymerization of the butadiene was 41.5% complete in 1 hour and 77.0% within 2 hours. The polymerization was terminated after 2½hours by adding 22.4 grams of crude abietic acid and 22.4 grams of di-t-butyl-paracresol. The total weight of polymer was 2403 grams or 86% yield. Infrared analysis of the polymer revealed that it was 97.4% cis-1,4, 1.1% trans-1,4 and 1.5% 1,2-polybutadiene. The polymer had a Mooney (ML-4) viscosity of 91 and the DSV was 4.1. The polymer contained no low molecular weight butadiene oligomers since the extractables (by a 50—50 volume % hexaneisopropanol solution) were zero.

EXAMPLE 9

A butadiene-benzene solution was prepared according to the procedure described in Example 8. The catalyst charged was 17.4 millimoles of triethylaluminum, 1.4 millimoles of nickel octanoate and 115 millimoles of HF. The polymerization was conducted at 50°C. for 20 hours and the final yield of polymer was 67½%. Infrared analysis indicated the elastomer had a composition of 96.6% cis-1,4; 1.7% trans-1,4 and 1.7% 1,2-polybutadiene. The Mooney (ML-4) was 57 and DSV was 3.1.

The polymer was compounded using a Budene test formula for tread stock. Some of the properties that it exhibited are as follows:

| | |
|---|---|
| Tensile Strength | 2650 psi |
| 300% Modulus | 1025 psi |
| Elongation | 600 % |
| Hot Tensile | 1220 psi |
| Tear (Instron) | 280 pound/inch |
| Dynamic Modulus | 100 dynes/sq. centimeter |
| Internal Friction | 33 kilopoise |
| Cold Rebound | 68% |
| Hot Rebound | 76% |
| Resilience | 47% |

While certain representative embodiments and details have been shown for the purpose of illustrating the invention, it will be apparent to those skilled in this art that various changes and modifications may be made therein without departing from the spirit or scope of the invention.

What is claimed is:

1. The process for the polymerization of butadiene and butadiene in mixture with other diolefins to form polymers containing at least 95% of the butadiene units in the cis-1,4 configuration which comprises contacting said monomer under solution polymerization conditions at temperatures ranging from about −10°C to about 100°C with a catalyst comprising
   1. at least one compound selected from the group of
      a. trialkylaluminums and
      b. aluminum dialkylhydrides and
   2. at least one organonickel compound selected from the group consisting of
      a. nickel salts of carboxylic acids,
      b. nickel acetylacetonate and
      c. nickel tetracarbonyl, and
   3. hydrogen fluoride in which the molar ratio of the compound of (1)/the compound of (2) ranges from about 2/1 to about 80/1, the mol ratio of the compound of (3)the compound of (2) ranges from about 3/1 to about 150/1 and the mol ratio of the compound of (3)/the compound of (1) ranges from about 1/1 to about 10/1 and each catalyst component (1), (2) and (3) being added to the polymerization mixture.

2. The process according to claim 1 in which the monomer is butadiene-1,3.

3. The process according to claim 1 in which the organonickel compound is selected from the group consisting of nickel salts of carboxylic acids and organic complex compounds of nickel.

4. The process according to claim 1 in which the polymerization is conducted as a solution polymerization in an inert diluent.

5. The process according to claim 1 in which the compound of (1) corresponds to the formula $$Al\ R_1R_2R_3$$

in which $R_1$ is selected from the group consisting of alkyl (including cycloalkyl), aryl, alkaryl, arylalkyl, hydrogen and fluorine, $R_2$ and $R_3$ is selected from the group of alkyl (including cycloalkyl), aryl, alkaryl and arylalkyl, the organonickel compound of (2) is a nickel salt of a carboxylic acid and in which butadiene alone is polymerized.

6. The process according to claim 5 in which the compound of (1) is a trihydrocarbylaluminum compound.

7. The process according to claim 6 in which the trihydrocarbylaluminum compound is a trialkylaluminum.

* * * * *